United States Patent
Hatakeyama et al.

(10) Patent No.: US 6,194,048 B1
(45) Date of Patent: Feb. 27, 2001

(54) MAGNETIC RECORDING DISK

(75) Inventors: Masahiro Hatakeyama; Katsunori Ichiki; Kenji Watanabe, all of Fujisawa; Kazuo Yamauchi, Yokohama; Shinta Kunitomo, Fujisawa; Yasushi Tohma, Osaka; Tohru Satake, Chigasaki, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/165,637

(22) Filed: Oct. 2, 1998

(30) Foreign Application Priority Data

Jul. 25, 1997 (JP) .................................... 2-15641
Jul. 25, 1997 (JP) .................................... 2-15642

(51) Int. Cl.$^7$ ..................................... B32B 3/02
(52) U.S. Cl. .................. 428/65.4; 427/129; 427/131; 427/132; 428/65.5; 428/65.6; 428/65.8; 428/337; 428/600; 428/611; 428/650; 428/680; 428/687; 428/694 TS; 428/694 TC; 428/694 TR; 428/694 BP; 428/694 BR; 428/694 SG; 428/695; 428/704; 428/728; 428/900
(58) Field of Search ..................... 427/131, 132, 427/129; 428/900, 600, 611, 650, 680, 687, 65.4, 65.5, 65.6, 65.8, 337, 694 TS, 694 TC, 694 TR, 694 BP, 694 BR, 694 SG, 695, 704, 728

(56) References Cited

U.S. PATENT DOCUMENTS 5,887,336 * 3/1999 Watanabe ........................ 29/603.16

FOREIGN PATENT DOCUMENTS

| 08238426 | 9/1996 | (JP) . |
| 08238580 | 9/1996 | (JP) . |
| 08241884 | 9/1996 | (JP) . |
| 08293111 | 11/1996 | (JP) . |

* cited by examiner

Primary Examiner—Bernard Pianalto
(74) Attorney, Agent, or Firm—Wenderoth, Lind & Ponack, L.L.P.

(57) ABSTRACT

A magnetic recording disk having on its surface a texture structure of fine surface irregularities with reduced variations, which is suitable for high-density magnetic recording, and a method of manufacturing such a magnetic recording disk are provided. The magnetic recording disk has a substrate 11, 12 (16) coated on a surface thereof with a magnetic layer 13, a carbon layer 14, and a lubricating film 15. The substrate has on a surface thereof a texture structure of fine surface irregularities for reducing friction when the substrate is brought into contact with a head and controlling an amount of lift of the head. The fine surface irregularities have a height of 20 nm or less and are formed from a pattern shape or profile of a shield with a high-speed atomic beam emitted from a high-speed atomic beam source.

9 Claims, 6 Drawing Sheets

MAGNETIC RECORDING DISK

Japanese patent applications Nos. 215641 and 215642, filed on Jul. 25, 1997, U.S. Pat. No. 5,640,009, and Japanese laid-open patent publication No. 1993-182787, which serve as a basis for the present application, are incorporated by reference herein.

BACKGROUND OF THE INVENTION

1. Field of the Invention

The present invention relates to a magnetic recording medium for use in hard disk drives or the like. More particularly, it relates to a magnetic recording disk having a fine surface irregularity structure (texture) on its surface, and a method of manufacturing such a magnetic recording disk.

2. Description of the Related Art

Magnetic recording disks for use in conventional hard disk drives or the like comprise an Ni—P layer, a magnetic layer, a protective film, a surface lubricating layer, etc. successively formed on a surface of a substrate made of an aluminum material or the like. In recent years, a glass substrate has been finding practical use in place of the aluminum substrate to meet demands for hardness and smoothness.

The above hard disk drives have heads with a minimized lift, i.e., a semicontact head, in view of ever-increasing demands for higher recording density. Therefore, it has been desired to make the surface of magnetic recording disks smoother. However, if the surface of magnetic recording disks is too smooth, it attracts the head to the extent the head sticks inseparably to the surface. As a result, the surface of magnetic recording disks should preferably have certain microscopic surface irregularities (texture).

The texture of conventional magnetic recording disks has been formed by a mechanical abrading process to abrade the surface of the Ni—P layer or the like on the aluminum substrate with an abrasive tape or an abrasive cloth.

If an abrasive tape is used, then the abrasive tape carries abrasive grain bonded to its opposite surfaces to abrade the surface of the disk. Specifically, the abrasive tape is pressed against the surface of the disk, and the surface of the disk is rotated to produce abrasive grooves thereon for thereby forming a texture structure composed of fine surface irregularities. If an abrasive cloth is used, then an abrasive solution containing abrasive grain is dropped onto the abrasive cloth, and the surface of the disk to be abraded is pressed against the abrasive cloth and rotated to produce abrasive grooves thereon.

Fine surface irregularities (texture) are formed on the surface of a magnetic recording disk having a glass substrate by dissolving the surface with a vapor of hydrofluoric acid or crystalline deposition. When a texture is formed on the surface of a magnetic recording disk by dissolving the surface with a vapor of hydrofluoric acid, the surface is dissolved at locally different rates due to different vapor adsorption or density rates to form fine surface irregularities on the surface. When crystalline deposition method is employed, the size of crystal grain in the glass substrate is controlled by heat treatment to separate crystal grain irregularities on the surface, turning the surface into a fine surface irregularity structure.

In the mechanical texture forming processes using the abrasive tape or the abrasive cloth, the accuracy is poor, and the surface irregularities suffer large variations. These problems make it difficult to use a semicontact head whose lift is about 30 nm.

It has been attempted to apply a laser beam to form the fine surface irregularity structure (texture). Specifically, a laser beam having a very small diameter focused by a lens and a focusing mirror is scanned over and applied to the surface of the disk to concentrate the energy of the laser beam on a small area. The concentrated laser beam brings about a laser abrasion phenomenon to produce crater-like surface irregularities at regular intervals as the texture structure.

Usually, a pulse laser is used to produce the above laser abrasion phenomenon. Height variations of the surface irregularities may possibly be caused by variations of laser spot diameter and laser beam intensity depending on the position on the disk, and time-dependent variations of laser intensity. A limitation on the number of times that the laser beam can repeatedly be applied (the frequency at which the laser beam is applied) is considered to result in a limitation on the number of surface irregularities. Therefore, it needs a long process time to form a texture structure on the entire disk surface with a laser beam. When a surface irregularity structure having a height of 20 nm or less is needed as a fine texture for a high magnetic recording density, the frequency at which the pulsed laser beam is to be repeatedly applied usually ranges from 1 to 10 kHz. Consequently, if surface irregularities are to be formed in the shape of regular triangles at a pitch of 10 $\mu$m, then about 115 tens of thousands of surface irregularities have to be produced per 1 cm$^2$. It takes about 1156 second/cm$^2$ if the repetition frequency is 1 kHz, and 115 second/cm$^2$ if the repetition frequency is 10 kHz. Thus, it requires a long process time to form a texture structure on the entire disk surface, resulting in problems of high cost and process time, which make the process not practical.

When a metal surface is left to stand in the atmosphere, a natural oxide layer is usually formed on the outermost surface layer. Though the natural oxide layer takes a different form depending on the material thereof, a natural oxide layer having a thickness of 3–5 nm is formed on an Ni—P layer on an aluminum material. In the process based on the laser abrasion phenomenon, the natural oxide layer and a non-oxide layer have different characteristics to absorb and reflect the laser beam. Therefore, when the disk surface is melted by the laser abrasion, the natural oxide layer and the non-oxide layer have different melting properties. Variations of the depth of focus of the laser beam greatly affect variations of the height of produced fine surface irregularities, making it difficult to form fine surface irregularities that are of a uniform height.

Efforts have been made to form the texture with an energy ion beam. According to this process, an ion beam or plasma is used to produce a fine surface irregularity structure, and generated ions are electrically accelerated and applied to the disk surface for thereby processing the disk surface. A resist film pattern according to the photolithography technology is used to pattern the disk surface to form the fine surface irregularity structure. Since, however, the resist film pattern is generally of an insulating material, it suffers the problem of being charged up.

As described above, a natural oxide layer is formed on the outermost layer of a metal surface. Because the natural oxide layer is highly insulative, it tends to be charged up in the process which uses an ion beam or plasma, causing changes in the path of energy ions and fluctuations of the characteristics of the applied energy. As a consequence, the surface roughness is impaired, and the amount of local processing is not made uniform.

There are also processes of forming a surface irregularity structure on the surface of a glass substrate by dissolving the surface with a vapor of hydrofluoric acid or a method of crystalline deposition. These processes are also disadvantageous in that the accuracy is poor and the surface irregularities suffer large variations, which also make it difficult to use a semicontact head.

Specifically, because the process to dissolve the surface with a vapor of hydrofluoric acid uses variations of the amount of the vapor adsorbed to the glass substrate, the vapor density nonuniformities cause variations of the depth to which the surface is dissolved, increasing processed surface depth nonuniformities. Consequently, it is impossible to form fine surface irregularities having a height of 20 $\mu$m, for example, over the entire surface of the glass substrate with a uniform processed surface depth and a uniform density. The process based on crystalline deposition controls the crystal form of the glass through heat treatment for controlling the size and quantity of crystal particles separated on the surface according to the temperature. It is difficult to form fine surface irregularities over the surface of the glass substrate with a uniform processed surface depth and a uniform density because of nonuniform heat treatment, nonuniform crystal grain size, and nonuniform separated particles.

SUMMARY OF THE INVENTIONS

The present invention has been made in view of the above drawbacks. It is an object of the present invention to provide a magnetic recording disk having on its surface a texture structure of fine surface irregularities with reduced variations which is suitable for high-density magnetic recording, and a method of manufacturing such a magnetic recording disk.

According to the present invention, there is provided a magnetic recording disk having a substrate coated on a surface thereof with a magnetic layer, a carbon layer, and a lubricating film. The substrate has on a surface thereof a texture structure of fine surface irregularities for reducing friction when the substrate is brought into contact with a head and for controlling an amount of lift of the head. The fine surface irregularities have a height of 20 nm or less and are formed from a pattern shape or profile of a shield with a high-speed atomic beam emitted from a high-speed atomic beam source.

With the above arrangement of the invention, the magnetic recording disk has surface irregularities formed uniformly on its entire surface, the surface irregularities having a height of 20 nm or less. The amount of a lift of a head from the disk is reduced, and the head is not attracted to the disk. Therefore, the disk has a greatly increased magnetic recording density.

The substrate can be made of an aluminum material coated on a surface thereof with an Ni—P layer, with the surface irregularities being formed on said Ni—P layer.

The substrate can be made of an aluminum material coated on a surface thereof with an Ni—P layer, with the surface irregularities being formed on the surface of the aluminum material.

The substrate can be made of an aluminum material coated on a surface thereof with a carbon layer, with the surface irregularities being formed on said carbon layer.

The substrate comprises a glass substrate, and the surface irregularities can be formed on a surface of said glass substrate.

The substrate comprises a glass substrate, and the surface irregularities can be formed on said carbon layer.

According to the present invention, there is also provided a method of producing a magnetic recording disk having a substrate coated on a surface with successive films including a magnetic layer, a carbon layer, and a lubricating film. The method includes forming a texture structure of fine surface irregularities on a surface of said substrate or any one of the films from a pattern shape or profile of a shield with a high-speed atomic beam.

With the above arrangement of the invention, the method is capable of forming surface irregularities having a height of 20 nm or less uniformly on the entire surface of the magnetic recording disk within a short period of time. The amount of a lift of a head from the disk is reduced, and the head is not attracted to the disk. Therefore, the disk has a greatly increased magnetic recording density.

The high-speed atomic beam may be emitted from a high-speed atomic beam source using an inert gas such as an argon gas.

The high-speed atomic beam may also be emitted from a high-speed atomic beam source using a chlorine gas or a chlorine-based compound gas.

In order to form the fine surface irregularities on the surface of said substrate or any one of the films, fine particles are dispersed and placed on the surface of the substrate or any one of the films. Thereafter the high-speed atomic beam is applied to the surface to form the fine surface irregularities with a profile of the fine particles. The shield can thus easily be scattered and placed without relying on complex photolithography or the like.

The high-speed atomic beam may be emitted from a parallel-plate-type high-speed atomic beam source.

According to the present invention, there is further provided a method of producing a magnetic recording disk having a substrate coated on a surface with successive films including a magnetic layer, a carbon layer, and a lubricating film. This method includes applying a solution with substantially spherical fine particles dispersed therein to the surface of the substrate or a surface of any one of the films to scatter and place said fine particles on said surface, then applying a high-speed atomic beam from a parallel-plate-type high-speed atomic beam source to said surface to form surface irregularities on said surface with said fine particles serving as a shield, and then removing said fine particles from said surface by cleaning the surface.

The fine particles may comprise fine crystalline particles of any one of alumina, carbon, $Si_3N_4$, SiC, TiN, $ZrO_2$, and MgO.

DETAILED DESCRIPTION OF THE PREFERRED EMBODIMENTS

Figure 1A:
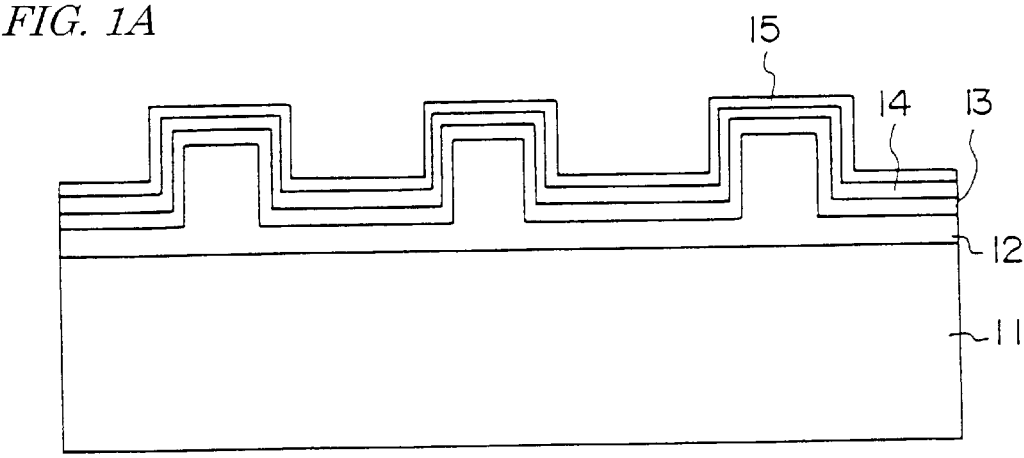
FIGS. 1A, 1B and 1C are views of magnetic recording disks according to a first embodiment of the present invention.
Figure 1B:
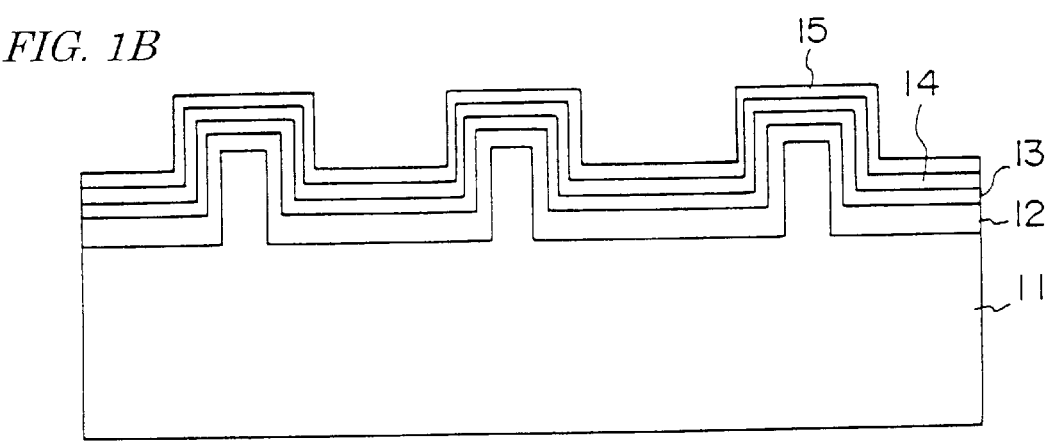
Figure 1C:
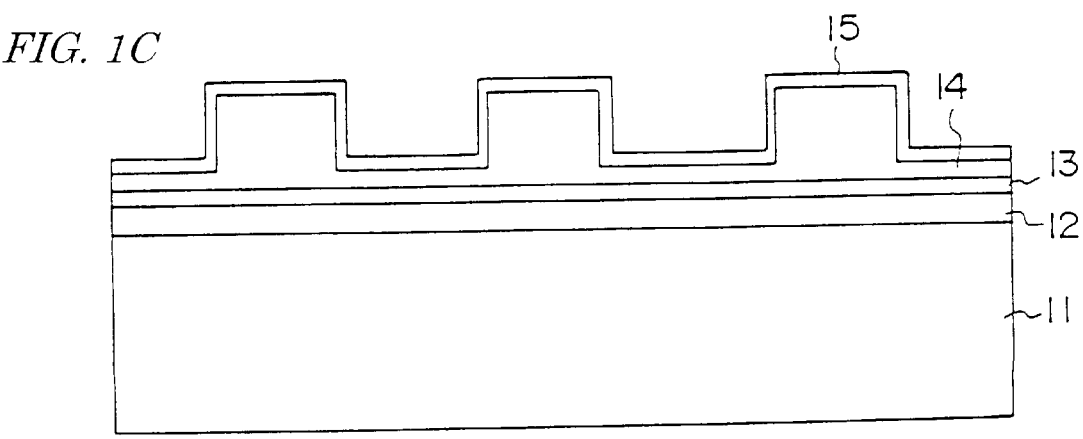

FIGS. 1A, 1B and 1C show various magnetic recording disks using an aluminum substrate according to a first embodiment of the present invention.

FIG. 1A shows a fine surface irregularity structure for texture which is formed on the surface of an Ni—P layer coated on an aluminum substrate according to a process of manufacturing a magnetic recording disk having a substrate of aluminum. In this embodiment, a metal layer, i.e., a nickel-phosphorus (Ni—P) layer 12, a magnetic layer 13, a carbon layer 14, and a lubricating layer 15 are successively coated on an aluminum substrate 11. The Ni—P layer 12 is a metal layer disposed between the aluminum substrate 11 and the magnetic layer 13. Magnetic recording is carried out on the magnetic layer 13 on the Ni—P layer 12. The carbon layer 14 and the lubricating layer 15 serve as an insulative surface protection layer. Magnetic recording and reading is carried out by a magnetic recording head (not shown) sliding on the surface of the insulative surface protection layer in a semicontact manner. In this embodiment, the Ni—P layer 12 has fine surface irregularities, providing surface irregularities (texture structure) on the surface of the disk. Since the surface irregularities are produced by a high-speed atomic beam and a shield, as described later on, the surface irregularities have a very small height of 20 nm or less and are fine. The surface irregularities are also highly uniform with any variations thereof being of about ±5%. The surface irregularities include convexities having an outside diameter of about 5 $\mu$m and a density of about 12,000 convexities/mm$^2$.

In forming the surface irregularity structure (texture structure) on the Ni—P layer 12 with a high-speed atomic beam and a shield, a natural oxide layer having a thickness of 3–5 nm is formed on the surface of the Ni—P layer 12. While the metal Ni—P layer is electrically conductive, the natural oxide layer as the outermost surface layer is insulative. When the Ni—P layer is processed to a depth of 20 nm or less, therefore, the natural oxide layer has a large effect. As described above with respect to the related art, when the surface is processed with an ion beam or plasma, the surface roughness increases and the amount of processing suffers nonuniformities as the natural oxide layer is charged up. When the laser abrasion process is employed, the oxide layer and the Ni—P layer beneath the oxide layer have different melting properties, and variations of the depth of focus of the laser beam greatly affect variations of the height of produced fine surface irregularities, making it difficult to form fine surface irregularities that are of a uniform height.

According to this embodiment, a high-speed atomic beam is applied to the surface of the Ni—P layer 12 in order to process the surface of the Ni—P layer 12 including the natural oxide layer to form fine surface irregularities (texture structure) accurately to a uniform height. The high-speed atomic beam is a beam of electrically neutral atoms or molecules having an energy level of several tens eV or higher. The high-speed atomic beam is usually used in an energy region from several hundreds to 10 keV. When the high-speed atomic beam is used, since it is a beam of electrically neutral atoms/molecules, the amount by which the natural oxide layer is charged up can be reduced, and the high-speed atomic beam can be applied uniformly to the natural oxide layer irrespective of whether the natural oxide layer is charged up or not. Consequently, the surface of the Ni—P layer including the natural oxide layer can be processed into a fine surface irregularity structure having a uniform height of 20 nm or less accurately over the entire surface of the magnetic recording disk.

The shield may comprise a pattern mask of electroformed Ni or a mask having a pattern of Si formed by dry etching or wet etching. Particularly, in order to achieve a mask having a patterned hole shape of a high aspect ratio, a pattern may be fabricated using a special resist according to a process called a LIGA process or a laser LIGA process, and molded of nickel to produce a mask. Specifically, a resist pattern of a high aspect ratio may be formed using a radiation such as a soft X-ray or an ultraviolet laser, and electroformed of nickel to produce a pattern mask of a high aspect ratio which has a fine pattern.

For forming fine surface irregularities on the Ni—P layer, the pressure of a vapor of a reaction product generated by a reaction between nickel and a reactive gas is low. Therefore, even when chemical sputtering based on chemical reactivity is effected, since the reaction product has poor sublimability, the reaction product tends to be attached again even though the surface is processed in a high vacuum condition. As a result, the roughness of the processed surface is impaired, and the Ni—P layer may not be removed because the film growth rate is higher than the processing rate. When the surface of the Ni—P layer including the natural oxide layer is to be processed into fine surface irregularities having a height ranging from 10 to 20 nm or less than 10 nm, it can be processed efficiently if a high-speed atomic beam of an inert gas such as an argon gas is applied to the surface for physical sputtering.

As described above, Ni is less chemically reactive with a reactive gas. The pressure of a vapor of a reaction product generated by a reaction with atoms or molecules of chlorine is relatively high, so the reactive gas of chlorine can remove the Ni—P layer by way of chemical sputtering more efficiently than other reactive gases. Inasmuch as the pressure of a vapor of a reaction product generated by a reaction between phosphorus (P) and chlorine is high, it poses no problem in removing the Ni—P layer. A reaction product generated by a reaction between nickel (Ni) and chlorine may cause less sublimation depending on processing conditions. In such a case, the surface of the Ni—P layer is heated by a lamp or the like to increase the temperature of the disk surface and the reaction product in the vicinity thereof, and also to improve the reactivity for thereby effecting chemical sputtering on nickel (Ni) with a high-speed atomic beam of atoms or molecules of chlorine. Not only gases of chlorine and chlorine compounds, but also a mixture of argon and chlorine or chlorine compound gases may be used to process the surface based on both physical sputtering and chemical sputtering. This is effective when the chemical sputtering process alone is not efficient.

For forming fine surface irregularities for texture, the shield is placed on the disk or spaced upwardly from the disk for transferring the surface irregularity pattern. If a resist pattern film is fabricated according to the ordinary lithography technology, the fabrication process is very complex, resulting in an increase in the process time and an increase in the cost. The shield may be in the form of fine particles in order to form a fine surface irregularity structure in a short period of time and also to form fine surface irregularities on the entire disk surface at a uniform density. When the surface of the Ni—P layer is processed by a high-speed atomic beam with particles used as the shield, it is possible to process the surface of the Ni—P layer in a pattern accurately transferred from the profile of the fine particles. If fine particles of alumina are used, they are uniformly dispersed and placed at a uniform density on the disk surface according to the following procedure.

First, fine particles of alumina are dissolved in a solution of alcohol or the like, and uniformly dispersed by ultrasonic vibrations. The solution with the fine particles uniformly dispersed therein is dropped onto a disk substrate plated on a rotating machine, and then the disk substrate is rotated to spread the solution uniformly and place the solution over the disk substrate. Alternatively, the solution with the fine particles uniformly dispersed therein is dropped onto a disk substrate which is being rotated, so that the solution is spread uniformly and placed over the disk substrate. One reason why fine particles of alumina are used is that alumina is highly stable chemically and has low physical and chemical sputtering rates. Specifically, the amount of particles sputtered from alumina upon exposure to a high-speed atomic beam is small, and any degradation of the surface roughness caused by a surface redeposition due to the sputtered particles is very small. Therefore, the pattern of fine particles can be transferred without impairing the roughness of the processed surface.

Depending on the type of fine particles, they are easily sputtered, and the sputtered particles or a reaction product generated by a reaction between the sputtered particles and nickel or phosphorus is redeposited on the processed surface, tending to impair the surface roughness. For example, since silver in silver-containing fine particles has a high sputtering rate, sputtered silver particles are redeposited on the processed surface, tending to impair the roughness of the processed surface. Another reason why fine particles of alumina are used is that fine particles of alumina can easily be dispersed without using a surface active agent, and can easily be removed from the disk surface by ultrasonic cleaning using alcohol after an exposure to a high-speed atomic beam. Depending on the type of fine particles, it is necessary to use a solution in which a surface active agent is dispersed, and the adsorption power at the disk surface changes owing to an exposure to a high-speed atomic beam, making it difficult to remove fine particles easily from the disk surface.

Fine particles of alumina produced by making alumina, according to an ordinary calcining process and crushing the alumina, are shaped as clusters of joined particles, but not as smooth spherical particles. Furthermore, since calcined alumina has widely different particle diameters, it is necessary to obtain classified alumina in order to make the sizes of surface irregularities uniform. If fine particles have smooth spherical shapes, then smooth circular or elliptical shapes can be patterned when transferred from the profile of the fine particles. The smooth circular pattern can achieve more efficient characteristics for a friction reducing mechanism. This is because worn particles are collected in grooves formed by transferring the pattern of cluster shapes, tending to impair friction reducing characteristics.

According to this embodiment, fine particles of alumina or other materials are in the form of fine crystalline particles produced by CVD or the like. Fine particles of alumina or other materials that are manufactured by crystal growth have a small particle size distribution and have substantially spherical shapes of uniform particle diameter. Since fine crystalline particles of alumina contain less mixed impurities than calcined fine particles of alumina, any degradation of the surface roughness caused by a redeposition due to sputtered impurities is reduced. Fine particles of other materials than alumina may be fine particles of carbons including diamond, graphite, or the like, and fine particles of $Si_3N_4$, SiC, TiN, $ZrO_2$, and MgO. According to this embodiment, therefore, the entire disk surface can be efficiently and highly accurately processed into a fine surface irregularity structure (texture structure) which is uniformly shaped, using fine particles of alumina or the like and a high-speed atomic beam source.

Figure 2:
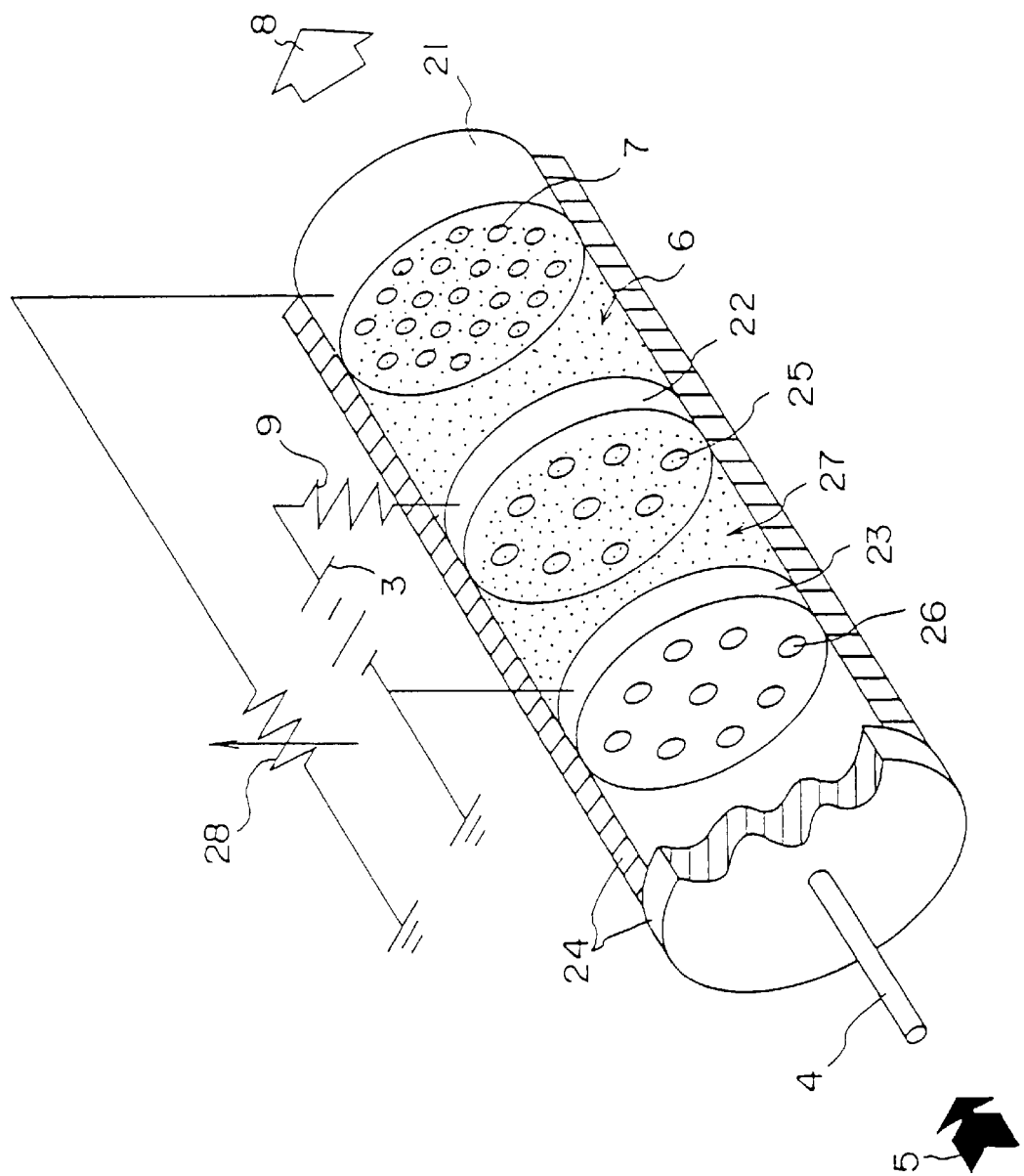
FIG. 2 is a view of a parallel-plate-type high-speed atomic beam source.

According to the present invention, a high-speed atomic beam source for generating a high-speed atomic beam comprises a parallel-plate-type high-speed atomic beam source. An example of such a parallel-plate-type high-speed atomic beam source is the high-speed atomic beam source disclosed in Japanese laid-open patent publication No. 5-182787 and U.S. Pat. No. 5,640,009 filed by the inventor of the present invention. As shown in FIG. 2, the high-speed atomic beam source comprises a planar cathode 21 having one or more atomic emission holes 7, a planar anode 22 disposed in confronting relation to the planar cathode 21 and having one or more holes, a cathode 23 confronting the planar anode 22 and sandwiching the planar anode 22 between itself and the planar cathode 21, and a gas inlet 4 for introducing a gas to cause an electric discharge between the two cathodes 21, 22 and the planar anode 22 while a negative potential is being applied to the cathode 23 and a positive potential is being applied to the planar anode 22. The planar cathode 21 and the planar anode 22 serve as parallel plates, and the high-speed atomic beam source has a large diameter and can emit a highly linear high-speed atomic beam.

The parallel-plate-type high-speed atomic beam source allows beam linearity and a neutralizing ratio to be controlled easily, and is capable of emitting a beam whose quantity has good locational uniformity. High-speed atomic beam sources have widely different beam neutralizing ratios, linearities, and beam quantity distributions depending on their type. If a high-speed atomic beam source with poor linearity and beam quantity distribution is used, then a surface irregularity structure of uniform height cannot be produced on the entire surface of a disk.

The above process of processing the surface of a disk into fine surface irregularities is also applicable to a layer other than the Ni—P layer. FIG. 1B shows an example in which fine surface irregularities are formed directly on the surface of an aluminum substrate 11. The fine surface irregularities are formed using a high-speed atomic beam and a pattern mask or spherical particles of alumina. Before being processed, the surface of the aluminum substrate 11 is highly flat to about ±1 nm. After it is processed, surface irregularities having a height of about 20 nm or less are formed thereon, with a height variation of about ±5%. After the surface irregularity structure is formed, an Ni—P layer 12 is formed thereon, and then a magnetic layer 13, a carbon layer 14, and a surface lubricating layer 15 are successively coated, in the manner described above.

FIG. 1C shows an example in which a carbon layer 14 is processed into a fine surface irregularity structure. Specifically, an Ni—P layer 12 is formed on an aluminum substrate 11, and then a magnetic layer 13 and a carbon layer 14 are formed. The carbon layer is processed into fine surface irregularities using the high-speed atomic beam and the shield as described above. After the fine surface irregularities are formed, a surface lubricating layer 15 is formed. If the fine surface irregularities are formed on the aluminum substrate 11 or the Ni—P layer 12 thereon, then the shape and depth of the fine surface irregularities are varied by the subsequent deposition of the magnetic layer 13, the carbon layer 14, and the surface lubricating layer 15, tending to result in a surface irregularity structure whose values are different from previously intended design values. In this example, however, since the carbon layer 14 is very close to the surface, it would not be subject to changes in the shape of surface irregularities due to the deposition of various layers, and the shape of surface irregularities according to previously intended design values can be obtained. After the fine surface irregularities are formed on the carbon layer 14, the disk is finally cleaned with precision, and thereafter the surface lubricating layer 15 is formed. Consequently, the disk can be manufactured with its surface being kept highly clean.

Figure 3A:
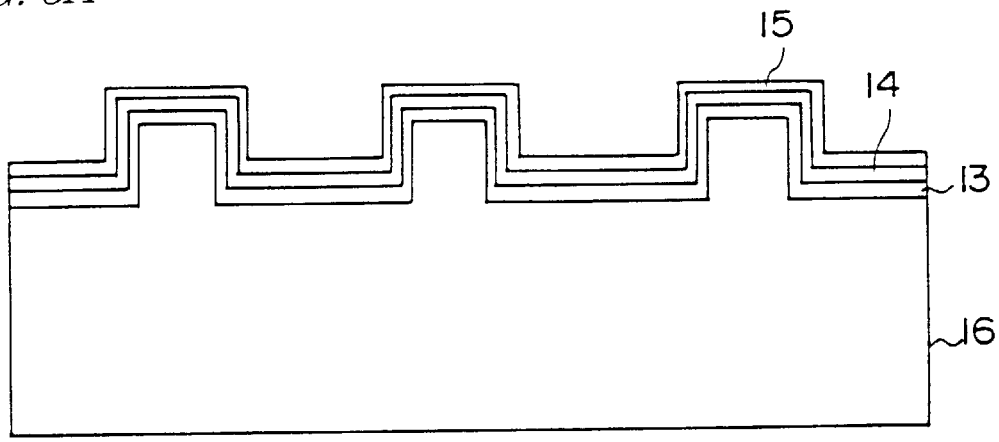
FIGS. 3A and 3B are views of magnetic recording disks according to a second embodiment of the present invention.
Figure 3B:
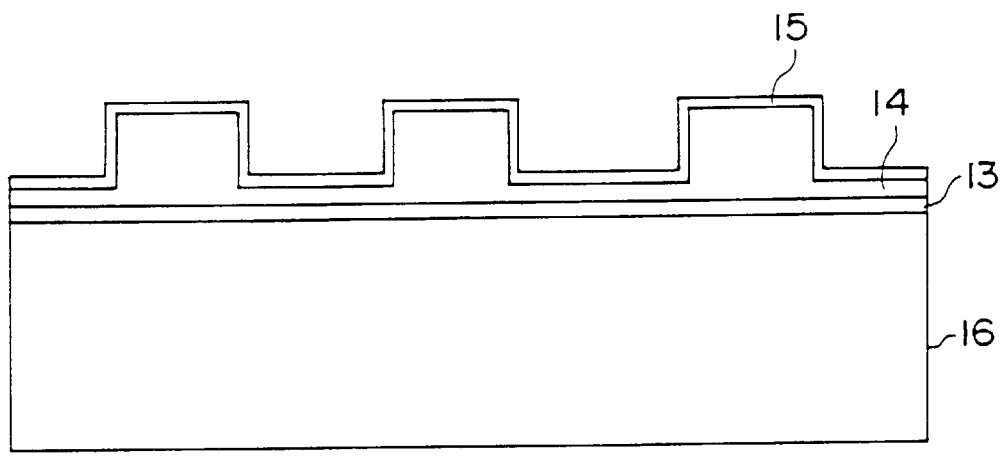

FIGS. 3A and 3B show magnetic recording disks according to a second embodiment of the present invention.

FIG. 3A shows an example in which a fine surface irregularity structure for texture is formed directly on a glass substrate in the process of producing a magnetic recording disk using the glass substrate. In this example, a magnetic layer 13, a carbon layer 14, and a lubricating layer 15 are successively coated on a glass substrate 16 with a fine surface irregularity structure formed thereon. Magnetic recording is effected on the magnetic layer 13. The carbon layer 14 and the lubricating layer 15 serve as an insulative surface protection layer. Magnetic recording and reading is carried out by a magnetic recording head (not shown) sliding on the surface of the insulative surface protection layer in a semicontact manner. In this embodiment, the glass substrate 16 has fine surface irregularities, providing surface irregularities (texture structure) on the surface of the disk. Since the surface irregularities are produced by a high-speed atomic beam and a shield, as with the magnetic recording disk using the alumina substrate as described above, the surface irregularities have a very small height of 20 nm or less and are fine. The surface irregularities include convexities having an outside diameter of about 5 $\mu$m and a density of about 12,000 convexities/mm$^2$.

According to this embodiment, a high-speed atomic beam is applied to the surface of the glass substrate 16 in order to process the surface of the glass substrate 16 to form fine surface irregularities accurately to a uniform height. The high-speed atomic beam is a beam of electrically neutral atoms or molecules having an energy level of several tens eV or higher. The high-speed atomic beam is usually used in an energy region from several hundreds to 10 keV. When the high-speed atomic beam is used, since it is a beam of electrically neutral atoms/molecules, the amount by which the insulative layer is charged up can be reduced, and the high-speed atomic beam can be applied uniformly to the glass substrate layer irrespective of whether the insulative layer is charged up or not. Consequently, the surface of the glass substrate can be processed into a fine surface irregularity structure having a uniform height of 20 nm or less accurately over the entire surface of the magnetic recording disk.

The above process of processing the surface of a disk into fine surface irregularities is also applicable to a layer other than the glass substrate. FIG. 3B shows an example in which fine surface irregularities are formed directly on the surface of a carbon layer 14. The carbon layer is processed into fine surface irregularities using the high-speed atomic beam and the shield as described above. After the fine surface irregularities are formed, a surface lubricating layer 15 is formed. If the fine surface irregularities are formed on the glass substrate 16, then the shape and depth of the fine surface irregularities are varied by the subsequent deposition of the magnetic layer 13, the carbon layer 14, and the surface lubricating layer 15, tending to result in a surface irregularity structure whose values are different from previously intended design values. In this example, however, since the carbon layer 14 is very close to the surface, it would not be subject to changes in the shape of surface irregularities due to the deposition of various layers, and the shape of surface irregularities according to previously intended design values can be obtained. After the fine surface irregularities are formed on the carbon layer 14, the disk is finally cleaned with precision, and thereafter the surface lubricating layer 15 is formed. Consequently, the disk can be manufactured with its surface being kept highly clean.

FIRST INVENTIVE EXAMPLE

Figure 4A:
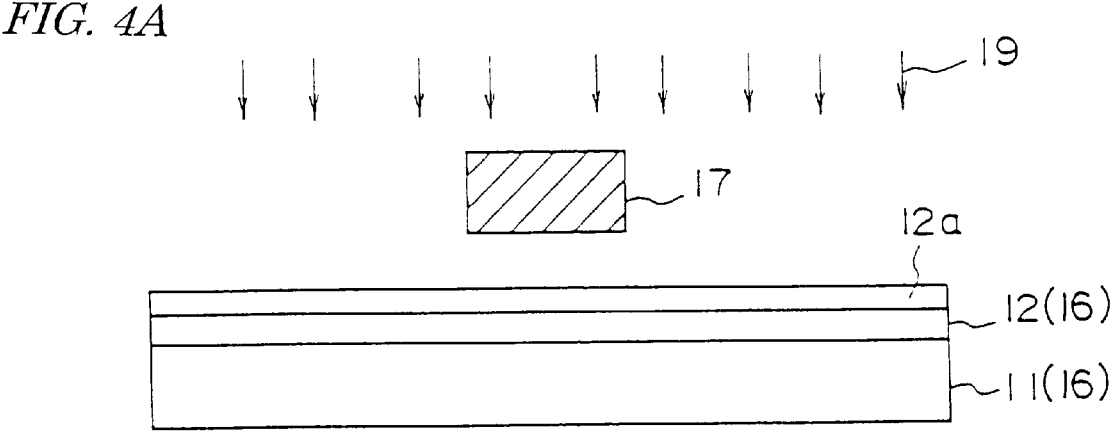
FIGS. 4A, 4B and 4C are views illustrating a process of forming fine surface irregularities according to a first inventive example of the present invention.
Figure 4B:
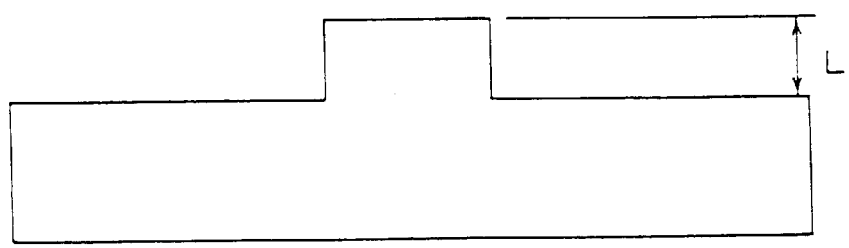
Figure 4C:
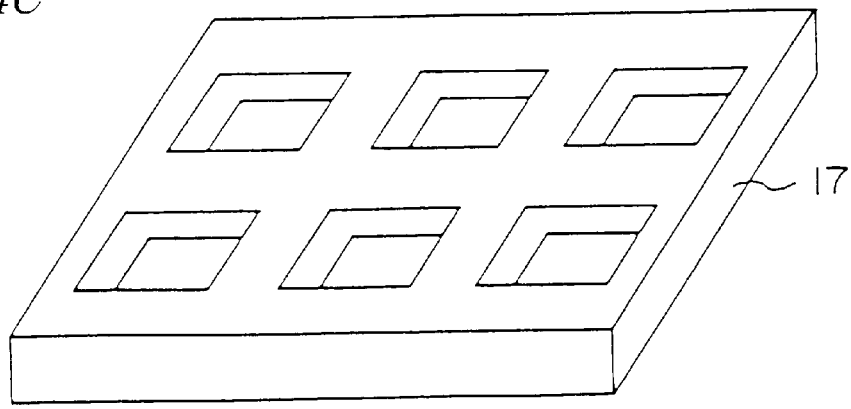

A first inventive example of a method of forming fine surface irregularities (texture structure) is shown in FIGS. 4A–4C. As shown in FIG. 4A, an Ni—P layer 12 having a thickness of 2–10 microns is coated on the surface of an aluminum substrate 11, and has a surface roughness of about 1 nm or less. The surface of the Ni—P layer 12 is covered with a natural oxide layer 12a. The Ni—P layer 12 is processed into a fine surface irregularity structure for texture using a shield and a high-speed atomic beam, as shown in FIG. 4B. Subsequently, a magnetic layer 13, a carbon layer 14, and a lubricating layer 15 are successively coated, thereby completing an ultrahigh density magnetic recording disk. The disk which is of a circular shape has a size of about 20–130 mm in diameter.

Fine surface irregularities may be formed on the surface of the glass substrate 16 rather than the aluminum substrate 11. The glass substrate 11 has a surface roughness of about 1 nm or less. The surface thereof is processed into a fine surface irregularity structure for texture using a shield and a high-speed atomic beam. Subsequently, a magnetic layer 13, a carbon layer 14, and a lubricating layer 15 are successively coated, thereby completing an ultrahigh density magnetic recording disk. The disk which is of a circular shape similarly has a size of about 20–130 mm in diameter.

In processing the Ni—P layer 12 or the glass substrate 16, a shield 17 comprising a mask having pattern holes produced from electroformed nickel as shown in FIG. 4C is employed. The pattern mask 17 produced from electroformed nickel has holes of a square shape of 20×20 $\mu$m, round corners having a radius of about 3 $\mu$m, a hole-to-hole distance of about 10 $\mu$m, and a thickness of about 10–100 $\mu$m. The mask has a size large enough to cover the entire surface of the disk. A similar pattern mask can be made by forming holes in an Si substrate according to plasma etching or wet etching. Similar processing may be applied to aluminum board, a carbon layer, a glass substrate, etc.

The fine surface irregularities (texture structure) are formed in a vacuum chamber, into which a disk substrate is delivered from a load-lock chamber. If necessary, the substrate is loaded on a rotatable and vertically movable stage. In the vacuum chamber, the substrate 11 (16) is placed on the stage, and the pattern mask 17 is disposed in intimate contact with the substrate 11 (16). A high-speed atomic beam of argon is emitted from a parallel-plate-type high-speed atomic beam source mounted in the vacuum chamber, and applied to the surface of the substrate on which the pattern mask is disposed. The amount of processing is controlled by the time for which the atomic beam is applied to the substrate.

The high-speed atomic beam source is operated using an argon gas, as a parallel-plate-type high-speed atomic beam source as shown in FIG. 2. operating conditions for the high-speed atomic beam source include a beam diameter of 110 mm, a discharge voltage of 3 kV, a discharge current of 300 mA, and a neutralizing ratio of 80%. Times for which the high-speed atomic beam is applied are 15 seconds and 30 seconds. In order to control the density of a plasma, the high-speed atomic beam source has a magnetic field generator which applies a magnetic field of 500 gausses. When the high-speed atomic beam is applied for 15 seconds, the processed depth L is 7.5 nm. When the high-speed atomic beam is applied for 30 seconds, the processed amount is 15 nm. When the high-speed atomic beam is applied for both 15 and 30 seconds, the processed surface roughness is about the same as an initial surface roughness of 1 nm or less. A processed pattern similar to the pattern mask is transferred, and the processed depth is held to a variation of 35 5% or less over the entire surface of the disk.

SECOND INVENTIVE EXAMPLE

Figure 5A:
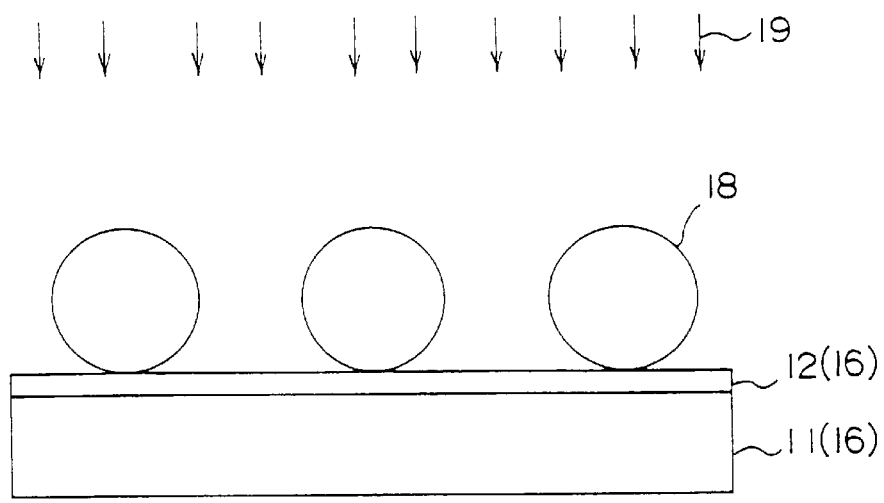
FIGS. 5A and 5B are views illustrating a process of forming fine surface irregularities according to a second inventive example of the present invention.
Figure 5B:
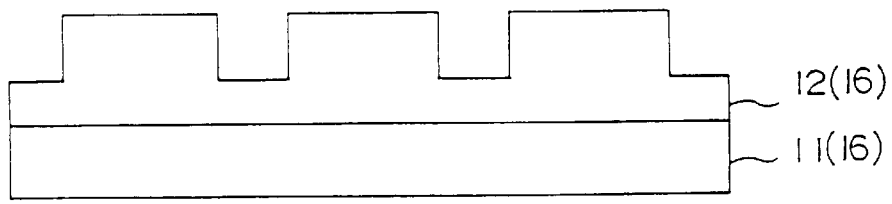

FIGS. 5A and 5B show another example in which fine surface irregularities (texture structure) are formed. In this example, the shield comprises substantially spherical fine crystalline particles 18 of alumina produced by CVD. These fine particles of alumina have a diameter of 5 $\mu$m, for example. The fine particles of alumina are uniformly dispersed, and uniformly scattered and placed over the surface of the Ni—P layer 12 on the aluminum substrate 11 or the glass substrate 16, as follows. First, the fine particles of alumina are dissolved in a solution of ethyl alcohol, and uniformly dispersed in the solution by ultrasonic vibrations. Then, a disk substrate is mounted on a rotary coating device, and rotated at a low speed of about 200 rpm while the solution containing the fine particles of alumina is dropping at a constant rate onto the circular substrate. Thereafter, the disk substrate is rotated at a high speed of about 5000 rpm to scatter and place the fine particles of alumina. The fine particles of alumina are scattered at a density of 12,000 particles/mm$^2$, so that they are scattered and placed at a uniform density. The disk with the fine particles of alumina thus scattered and placed thereon is processed by sputtering with a high-speed atomic beam 19 generated from a parallel-plate-type high-speed atomic beam source using an argon gas and applied for 15–30 seconds. Thereafter, the disk is ultrasonically cleaned to remove the fine particles 18 of alumina easily from the surface of the disk.

The vacuum chamber, the high-speed atomic beam source, the type of the substrate, and the experimental conditions are the same as those in the first inventive example. Times for which the high-speed atomic beam is applied are 15 seconds and 30 seconds. When the high-speed atomic beam is applied for 15 seconds, the processed amount is 7.5 nm. When the high-speed atomic beam is applied for 30 seconds, the processed amount is 15 nm. When the high-speed atomic beam is applied for both 15 and 30 seconds, the processed surface roughness is about the same as an initial surface roughness of 1 nm or less. The processed pattern is exactly the same as a pattern transferred from the profile of the fine crystalline particles of alumina. The processed depth can be held to a variation of ±5% or less over the entire surface of the disk. The processing can similarly be applied to the surface of an aluminum substrate or a carbon layer.

THIRD INVENTIVE EXAMPLE

Figure 6A:
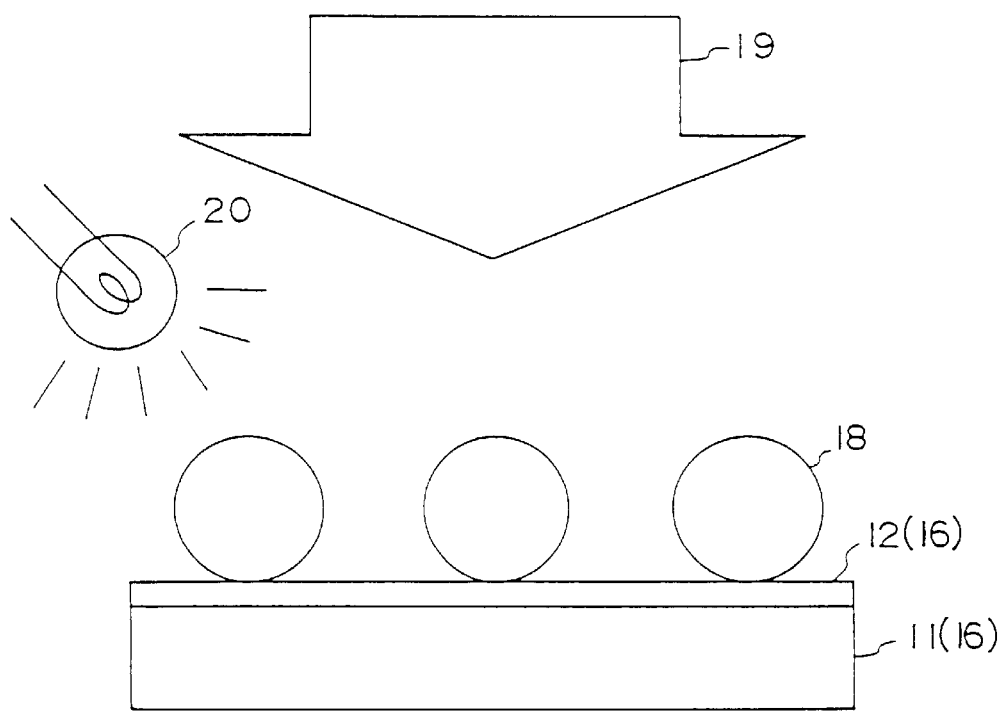
FIGS. 6A and 6B are views illustrating a process of forming fine surface irregularities according to a third inventive example of the present invention.
Figure 6B:
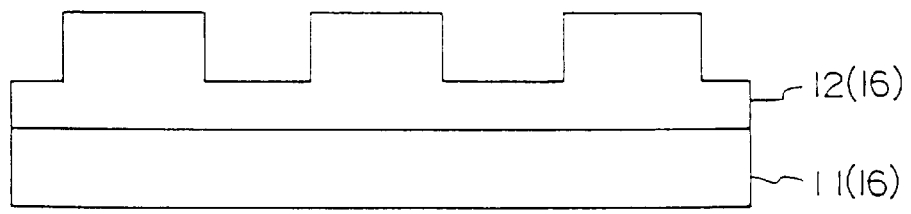

FIGS. 6A and 6B show an example in which an Ni—P layer 12 or a glass substrate 16 is processed by a high-speed atomic beam using a chlorine gas. An Ni—P layer 12 is coated to a thickness of about 5 $\mu$m on both surfaces of an aluminum substrate 11 having an outside diameter of 130 mm. The Ni—P layer 12 may be coated on a glass substrate 16 rather than the aluminum substrate 11. Fine crystalline particles 18 of alumina are uniformly scattered and placed on both surfaces of the substrate at a density of about 12,000 particles/mm$^2$. The fine particles 18 of alumina have an outside diameter of 5 $\mu$m, and are scattered in the same manner as with the second inventive example.

The substrate is mounted on a substrate stage in a vacuum chamber, and a high-speed atomic beam is applied simultaneously to both surfaces of the substrate. Therefore, the vacuum chamber is equipped with two high-speed atomic beam sources. The stage grips the outer circumferential edge of the substrate 11 (16), and the high-speed atomic beam can be applied to a circular area having a diameter of 115 mm on both surface of the disk. The substrate 11 (16) is also irradiated with light from a xenon lamp 20 at the same time that it is irradiated with the high-speed atomic beam. The xenon lamp 20 assists in exciting chlorine molecules adsorbed to the surfaces of the substrate and subliming reaction-produced particles formed by chemical sputtering. The high-speed atomic beam source is a parallel-plate-type high-speed atomic beam source which is the same as those used in the above examples. Operating conditions for the high-speed atomic beam source include a beam diameter of 140 mm, the use of a chlorine gas, a discharge voltage of 3 kV, and a discharge current of 300 mA. Times for which the high-speed atomic beam is applied are 20 seconds and 40 seconds. When the high-speed atomic beam is applied for 20 seconds, the processed depth is 7.5 nm. When the high-speed atomic beam is applied for 40 seconds, the processed amount is 15 nm. When the high-speed atomic beam is applied for both 20 and 40 seconds, the processed surface roughness is about the same as an initial surface roughness of 1 nm or less. The processed pattern is exactly the same as a pattern transferred from the profile of the substantially spherical fine crystalline particles of alumina. The processed depth can be held to a variation of ±5% or less over the entire surface of the disk.

In the above examples, fine surface irregularities are formed on the Ni—P layer 12 or the glass substrate 16. However, the same processing can also be applied to other coated layers such as the surface of an aluminum substrate or a carbon layer. No matter which surface is processed, it can finely be etched to a depth on the order of nanometers by being irradiated with an electrically neutral high-speed atomic beam while being masked with a scattered and placed shield. As a consequently, fine surface irregularities whose heights range from 5 to 20 nm can be formed, with any variation of the heights being held to 35 5% or less.

As described above, the present invention offers the following excellent advantages. The conventional technology for forming a fine surface irregularity structure for texture using an abrasive tape, an abrasive cloth, a vapor of hydrofluoric acid, or laser abrasion finds it highly difficult to fabricate a highly precise magnetic recording disk having a surface irregularity structure of an irregularity height of 20 nm or less over the entire surface of the disk at a uniform irregularity density with good irregularity height uniformity.

According to the present invention, the shape of a shield such as of fine particles of alumina or the like is transferred onto the surface of an aluminum substrate or a glass substrate or any of various coated layers by a high-speed atomic beam for highly accurately forming fine surface irregularities whose height is 20 nm or less, which are likely to be affected by an insulating material such as a natural oxide layer or the like, without impairing the surface roughness of the processed surface. Consequently, there are provided a method of processing the entire surface of a disk by a uniform amount and at a uniform pattern density, and a ultrahigh-precision magnetic recording disk fabricated according to the method. The ultrahigh-precision magnetic recording disk makes it possible to realize a magnetic recording device capable of achieving a magnetic recording density which is higher than heretofore approximately by a magnitude corresponding to one figure position. The ultrahigh-precision magnetic recording disk is thus highly useful in the information and communication industries. The present invention is therefore highly significant in the fields of engineering and industry.

What is claimed is:

1. A magnetic recording disk comprising:

a substrate;

a magnetic layer on said substrate;

a carbon layer on said magnetic layer; and a lubricating film on said carbon layer;

wherein one of said substrate and said carbon layer comprises a texture layer having a surface with fine surface irregularities for reducing friction when the disk is brought into contact with a head and for controlling an amount of lift of the head, said surface irregularities having a height no greater than 20 nm and being formed on said surface of said texture layer using a shield and a high-speed, electrically-neutral atomic beam, said texture layer comprising one of an insulating material and a conducting material having a thin insulating layer.

2. The disk of claim 1, wherein said substrate comprises said texture layer and is formed of an aluminum material.

3. The disk of claim 1, wherein said substrate comprises said texture layer and is formed of a glass material.

4. The disk of claim 1, wherein said substrate is formed of an aluminum material and said carbon layer comprises said texture layer.

5. The disk of claim 1, wherein said substrate is formed of a glass material and said carbon layer comprises said texture layer.

6. A magnetic recording disk comprising:

a substrate formed of an aluminum material;

an Ni—P layer on said substrate;

a magnetic layer on said Ni—P layer, a carbon layer on said magnetic layer, and a lubricating film on said carbon layer, wherein one of said substrate, said carbon layer, and said Ni—P layer comprises a texture layer having a surface with fine surface irregularities for reducing friction when the disk is brought into contact with a head and for controlling an amount of lift of the head, said surface irregularities having a height no greater than 20 nm and being formed on said surface of said texture layer using a shield and a high-speed, electrically-neutral atomic beam, said texture layer comprising one of an insulating material and a conducting material having a thin insulating layer.

7. The disk of claim 6, wherein said Ni—P layer comprises said texture layer.

8. The disk of claim 6, wherein said carbon layer comprises said texture layer.

9. The disk of claim 6, wherein said carbon layer comprises said texture layer.

* * * * *

UNITED STATES PATENT AND TRADEMARK OFFICE
CERTIFICATE OF CORRECTION

PATENT NO. : 6,194,048 B1
DATED : February 27, 2001
INVENTOR(S) : Masahiro Hatakeyama et al.

It is certified that error appears in the above-identified patent and that said Letters Patent is hereby corrected as shown below:

Title page,
Item [30] Foreign Application Priority Data, please change "2-15641" to
-- "9-215641"; and please change "2-15642" to "9-215642".

Claim 8,
Please change "carbon layer" to "substrate".

Signed and Sealed this

Twenty-ninth Day of January, 2002

Attest:

JAMES E. ROGAN
*Attesting Officer*  *Director of the United States Patent and Trademark Office*